United States Patent [19]
Bock

[11] Patent Number: 5,814,358
[45] Date of Patent: Sep. 29, 1998

[54] INJECTION MOLDING APPARATUS FOR PROCESSING THERMOPLASTIC MATERIALS

[75] Inventor: Stefan Bock, Bonn, Germany

[73] Assignee: Krupp Kautex Maschinenbau GmbH, Boon, Germany

[21] Appl. No.: 765,564
[22] PCT Filed: May 8, 1996
[86] PCT No.: PCT/DE96/00847
  § 371 Date: Dec. 23, 1996
  § 102(e) Date: Dec. 23, 1996
[87] PCT Pub. No.: WO96/35568
  PCT Pub. Date: Nov. 14, 1996

[30] Foreign Application Priority Data
  May 10, 1995 [DE] Germany .................... 195 17 009.1
[51] Int. Cl.⁶ ................................................ B29C 45/78
[52] U.S. Cl. ...................... 425/557; 425/558; 425/560; 425/561
[58] Field of Search .................... 425/557, 558, 425/560, 561

[56] References Cited

U.S. PATENT DOCUMENTS 3,175,248  3/1965  Swenson .
3,707,248  12/1972  Aker .
5,011,399  4/1991  Farrell ................................ 425/557
5,605,707  2/1997  Ibar .................................... 425/557

FOREIGN PATENT DOCUMENTS 2 491 818  4/1982  France .
91 10 240  11/1991  Germany .

Primary Examiner—Tim Heitbrink
Attorney, Agent, or Firm—Seidel, Gonda, Lavorgna & Monaco, PC

[57] ABSTRACT

An injection molding apparatus for processing thermoplastic materials has at least one plasticizer unit, at least one injection molding cylinder with associated emptying piston, and at least one injection molding mold. The injection molding cylinder is provided with a sleeve which is arranged reciprocally between a position in which communication with the injection molding mold is interrupted and a position in which communication with the injection molding mold exists. In the position in which the communication with the injection molding mold is interrupted, a passage is provided between the sleeve and the housing which is connected between the feed conduit from the plasticizer unit and a storage space defined on the inside by the sleeve. The outside diameter of the ejection piston is slightly smaller than the inside diameter of the sleeve so that remaining between the two is an annular gap through which the plastic material passes into the storage space from one end of the sleeve.

12 Claims, 4 Drawing Sheets

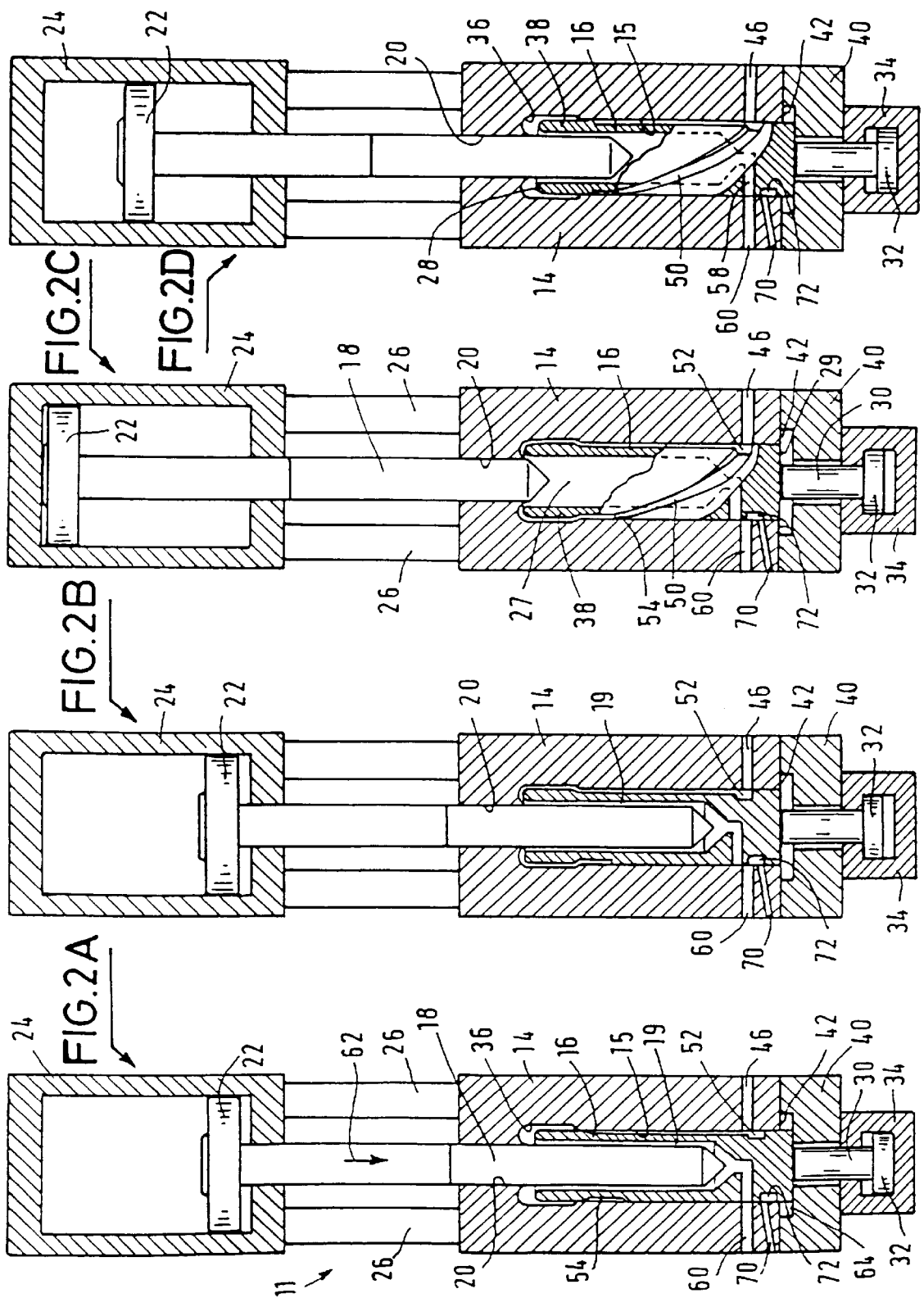

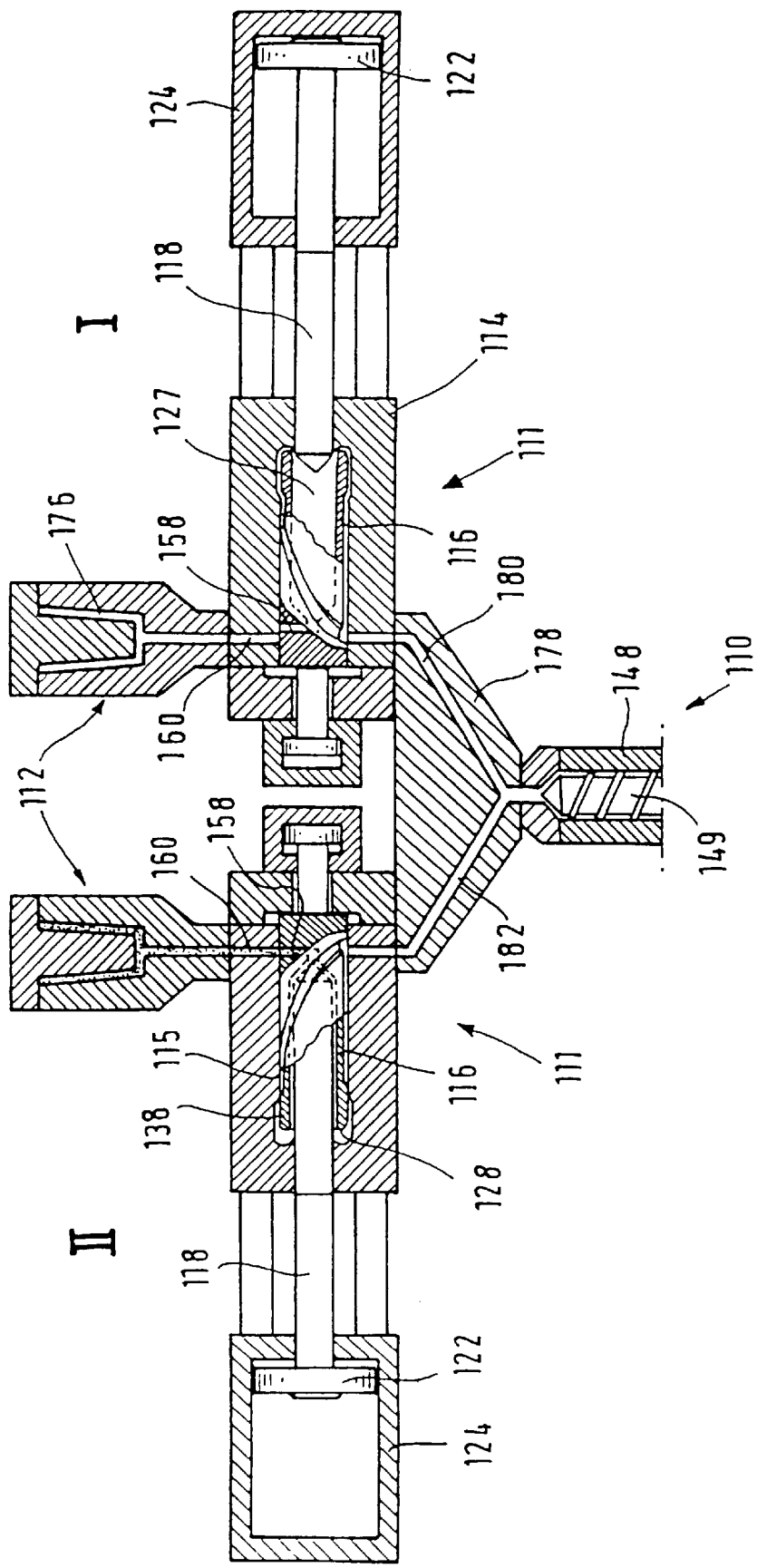

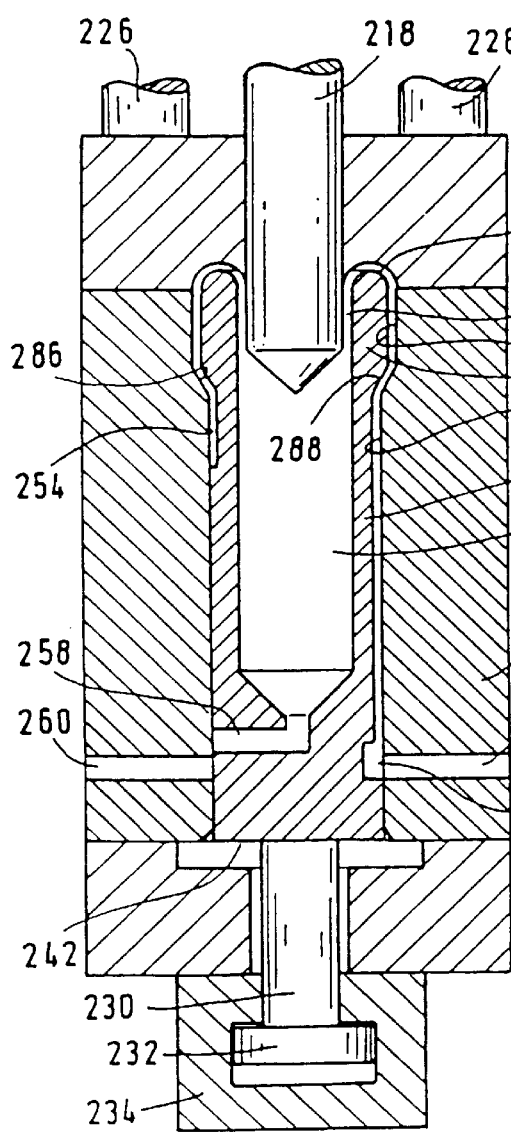
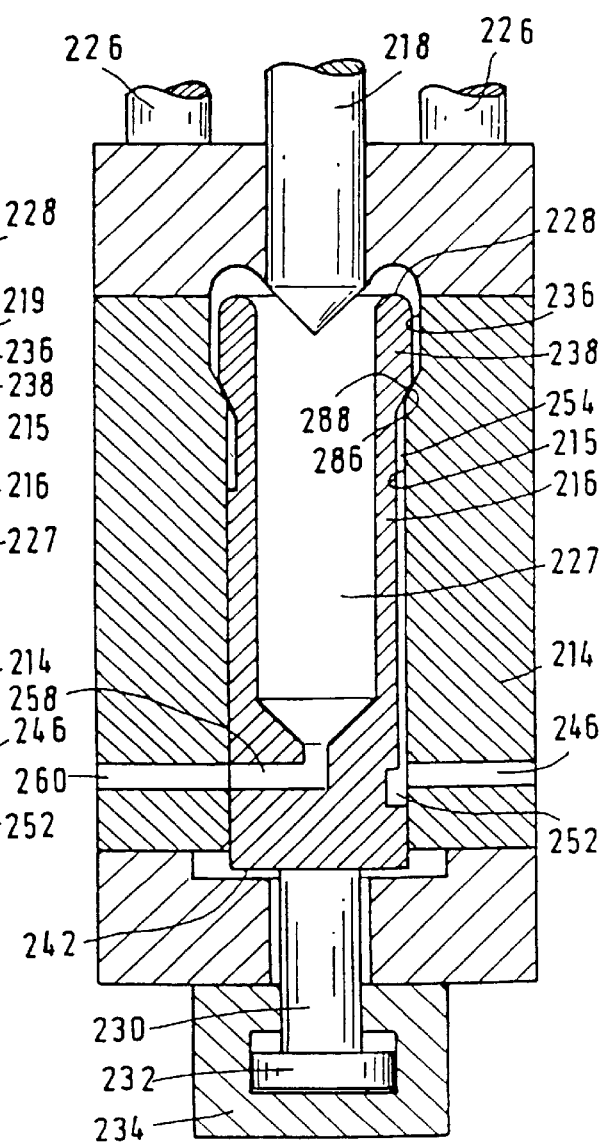

INJECTION MOLDING APPARATUS FOR PROCESSING THERMOPLASTIC MATERIALS

INJECTION MOLDING APPARATUS FOR PROCESSING THERMOPLASTIC MATERIALS

The invention concerns an injection molding apparatus for processing thermoplastic materials, which has at least one plasticizer unit, at least one injection molding cylinder with associated piston for emptying said cylinder and at least one injection molding mold.

In view of the fact that plastic materials, for example PET, which set high levels of requirement in regard to the operating conditions in the processing operation are increasingly also used for injection molding, it is necessary for the injection moulding machines to be so designed that they take account of those requirements so that it is possible to manufacture a product which satisfies all qualitative demands. For that purpose, as far as possible the plasticizer unit should be operated continuously, that is to say the screw which is generally provided in such a plasticizer unit should rotate continuously independently of the successive working cycles in order to be able to maintain a pressure which is as uniform as possible within the plasticizer unit. Continuous operation of the plasticizer unit is also advantageous in terms of circumstances which remain uniform as far as possible, in regard to other operating conditions and parameters, for example temperature and viscosity of the plasticized material. In addition, to achieve good quality for the end products, another aim is that the flow paths between the plasticizer unit and the injection molding tool should also experience as few fluctuations as possible and/or as slight fluctuations as possible, in regard for example to pressure, temperature and viscosity, in particular also with the aim of providing for careful and gentle treatment of the plastic material, for example in such a way as to avoid abrupt alterations in direction at a high flow speed as well as abrupt changes in the flow speed, but in particular also very high flow speeds and/or narrow flow cross-sections.

An injection molding machine which at least substantially takes account of those requirements should also be of a compact and space-saving design configuration, in particular in regard to the configuration and arrangement of flow ducts and injection molding cylinders, in relation to the level of productivity thereof, so that if necessary it is possible to associate with a plasticizer unit a plurality of injection molding tools which are alternatively charged with plastic material, by the plasticizer unit. Such an arrangement is based on the consideration that in many cases, in view of the time which is required in a working cycle for injection of the plastic material into the respective injection molding tool, cooling of the plastic material in that tool and removal of the finished article from the tool, a plasticizer unit of a suitable size should charge at least two injection molding tool units in order in that way to make the maximum possible use of the available output of the plasticizer unit.

German patent specification No 1 105 153 already discloses an injection molding machine for processing thermoplastic materials, in which the plastic material coming from a plasticizer unit which is in the form of a screw press is firstly conveyed into a pressure chamber disposed downstream of the plasticizer unit, wherein at the same time the plasticizer unit is displaced in the opposite direction to the direction of flow of the plastic material, in accordance with the increase in the volume of plastic material in the pressure chamber. After termination of the post-pressure phase for the plastic material which was introduced into the injection molding mold in the preceding working cycle, the plastic material in the first pressure chamber is conveyed by suitable actuation of the co-operating parts of the machine from the first pressure chamber through a one-way valve arranged between both chambers, into a second pressure chamber, while at the same time the plasticizer unit is pushed back again into its starting position at the beginning of the operation of filling the first pressure chamber. That is followed by closure of the injection molding mold which is then filled with plastic material by injection of the plastic material disposed in the second pressure chamber. That known injection molding apparatus admittedly enjoys the advantage that the plasticizer unit can be continuously operated, while in addition the substantially linear flow of the plastic material out of the plasticizer unit into the injection molding mold provides that all particles of plastic material have approximately the same residence time in the system before they pass into the injection molding mold. This also is a step which serves to achieve an end product of good quality. On the other hand however that design configuration of the known injection molding machine suffers from the disadvantage that it is very long in structure. It is also provided with valves which are actuated by the flowing plastic material. That results in the components provided with those valves being of a more complicated design, while in addition there is the danger that, because of the design of those valves, pieces of material become jammed in that region so that this then nonetheless results in irregular residence times for the plastic material in the system. In addition, in the case of this known injection molding machine, it would be difficult to provide two or more injection molding mold units which are charged alternately by the plasticizer unit.

Furthermore Plastverarbeiter, 45th Volume, 1994, No 8, pages 70–72 discloses an injection molding machine which is also provided with a plasticizer unit, an injection molding tool and a metering cylinder which is disposed therebetween and which is emptied by a piston towards the injection molding mold. That known injection molding machine is so designed that those pieces of material which, in the operation of filling the metering cylinder, had been lastly introduced into that cylinder, are first ejected from the metering cylinder by the piston and accordingly those pieces of material which, in the operation of filling the metering cylinder, were first introduced into same, are the last to be ejected therefrom. The consequence of this is that the individual particles of plastic material which, coming from the plasticizing unit, are passed through the system into the injection molding mold, have widely different residence times which, at any event in relation to more sensitive plastic materials, can have a markedly adverse effect on the quality of the finished products, especially as with that system there is the danger that the differences in regard to the residence times are very great and are possibly more than the duration of a working cycle. Those systems are also highly disadvantageous in the case of a change in material, which can include a change in colour.

The object of the invention is therefore that of designing an injection molding machine for processing plastic materials, in such a way that the machine does not suffer from the above-described disadvantages. In that respect the invention also seeks to make it possible to provide an arrangement in which two or more injection molding mold units each having an injection molding cylinder are associated with a plasticizer unit and the injection molding cylinders are alternately filled with plastic material from the plasticizer unit, wherein then during the operation of filling the one injection molding cylinder and the subsequent operation of injection of the plastic material into the one injection molding mold, the plastic material in the other injection molding mold cools down, with the post-pressure being maintained, and, after sufficiently cooling, the finished products are possibly also removed from the other injection molding mold.

To attain that object the invention proposes that the injection molding cylinder has a sleeve which is arranged axially reciprocably in a housing between a position in which the communication with the injection molding mold is interrupted and a position in which the communication with the injection molding mold exists, wherein a passage is provided between the sleeve and the housing at least in the position in which the communication with the injection molding mold is interrupted and at its one end the passage is communicated with the storage space delimited at the inside by the sleeve, at the entry end of the storage space, and the feed conduit for the plastic material coming from the plasticizer unit communicates with the passage in the region of the other end thereof and the outlet conduit for the plastic material stored in the storage space departs from the storage space towards the injection molding mold at the end remote from the entry end and the extent of the longitudinal displaceability of the sleeve is so selected that in the one end position of the sleeve the outlet conduit from the storage space is closed and a through-flow of plastic material is not possible and in the other end position of the sleeve the outlet conduit from the storage space is connected to the injection molding mold, the outside diameter of the ejection piston being slightly smaller than the inside diameter of the sleeve so that an annular gap remains between the two.

Further configurations according to the invention are set forth in the appendant claims.

That way of designing the apparatus makes it possible to guide the plastic material within same, in such a way that the residence time of the plastic material is rendered uniform at least to such an extent that the plastic materials which are first introduced into the apparatus also are the first to leave it, and are therefore the first to pass into the mold cavities of the injection molding tool. Nonetheless, with the configuration of the apparatus according to the invention, it is possible for example for the injection cylinder to be arranged for example in laterally displaced relationship with respect to the plasticizer unit and/or the injection molding tool, so that the overall apparatus can be of relatively short structure. There is also the possibility that the shut-off means which are required for controlling the flows of material during the individual phases of a working cycle in the injection cylinder are of such a simple design configuration that they do not give rise to any significant complication of the apparatus, they are less susceptible to repair and they are also controllable using simple means. If more than one unit comprising an injection cylinder and an injection molding tool is associated with the plasticizer unit, and if the two or more units are alternatively charged by the plasticizer unit, there is no need to provide shut-off members in units having the feed conduits going from the plasticizer unit to the individual injection molding cylinder and the injection molding tool as control of the plastic material flows which are fed alternately to the individual units can be achieved without involving additional expenditure, by virtue of the co-operation of the components of the injection molding cylinder.

BRIEF DESCRIPTION OF THE DRAWINGS

Two embodiments of the invention are illustrated in the drawing in which:

FIGS. 2A–2D are each diagrammatic views in longitudinal section showing the injection molding cylinder of an injection molding apparatus in four successive positions in a working cycle, FIG. 3 is a diagrammatic view in partial section of an injection molding apparatus with two injection molding cylinders and two injection molding molds, and FIGS. 4A and 4B are each diagrammatic views in longitudinal section showing the injection molding cylinder of a second embodiment in two successive positions in a working cycle.

DESCRIPTION OF THE INVENTION

Figure 1:
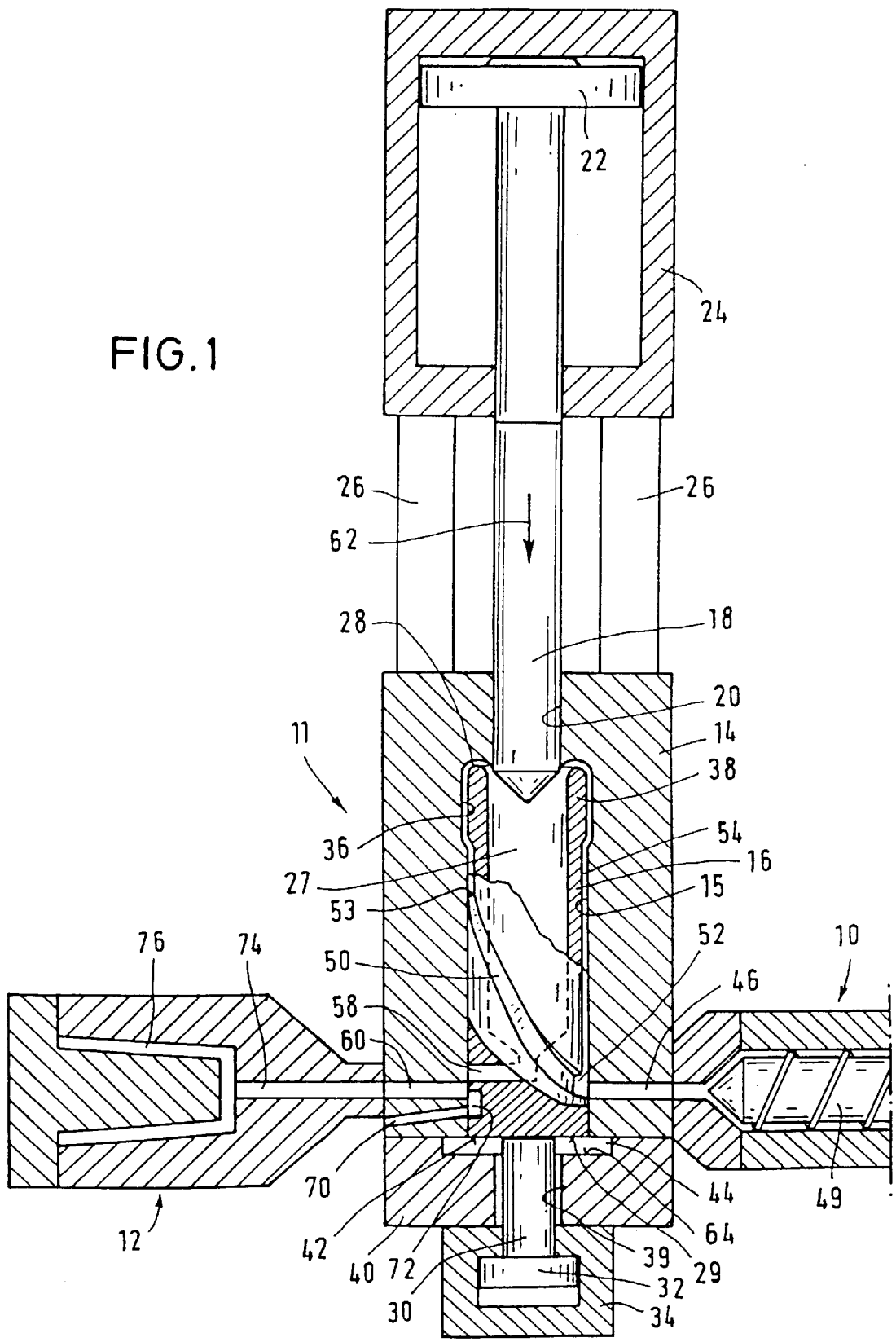
FIG. 1 is a diagrammatic view partly in section showing the structure of an injection molding apparatus.

The embodiment of FIG. 1 diagrammatically shows the basic structure of an injection molding apparatus on which the invention is embodied. The apparatus has a plasticizer unit 10, an injection molding cylinder 11 and an injection molding mold 12 which co-operate in a manner to be described hereinafter. The injection molding cylinder 11 is provided with a housing 14, in the cylindrical longitudinal bore 15 in which a sleeve 16 is longitudinally displaceably arranged. Associated with the sleeve 16 which is open at one end is an ejection piston 18 which is also axially displaceable and whose outside diameter is slightly smaller than the inside diameter of the sleeve 16 which is substantially cylindrical at its inside, so that an annular gap 19 (see for example FIG. 2A) remains between the ejection piston 18 and the inside peripheral surface of the sleeve 16. The bore 15 is continued beyond the region which accommodates the sleeve 16, into a coaxial portion 20 of smaller diameter, in which the ejection piston 18 is guided. The latter is provided at its end re-note from the housing 14 with a first drive piston 22 guided in a first hydraulic cylinder 24. The cylinder 24 is mounted to the housing 14 by way of bolts or the like 26. The internal space 27 delimited by the sleeve 16 is the storage space for the plastic material to be introduced into the injection molding tool 12.

The sleeve 16 is closed at its other end 29 and is connected to the piston rod 30 of a second piston 32 which is also arranged coaxially and which is guided in a second hydraulic operating cylinder 34.

At its end portion 36 towards the first cylinder 24, the bore 15 is of a somewhat larger diameter. The end portion 38 of the sleeve 16, which is towards the first cylinder 24, is of a somewhat larger outside diameter which corresponds to the inside diameter of the bore 15 in the smaller-diameter region thereof, wherein in the one end position of the sleeve 16 as shown in FIG. 1, its larger-diameter end portion 38 is disposed in the larger-diameter portion 36 of the bore 15, said larger-diameter portion 36 being of a suitable axial extent. In the second end position of the sleeve 16 which is shown in FIGS. 2A and 2D, a part of the thickened end portion 38 of the sleeve 16 is disposed in the smaller-diameter region of the bore 15, the outer peripheral surface of the thickened region 38 of the sleeve 16 sealingly co-operating with the region of the bore 15, which adjoins the region 36 and which has the smaller diameter. Accordingly therefore the thickened region of the sleeve 38 forms the closure part of a shut-off member which is reciprocable between an open and a closed position.

At the end towards the second cylinder 34 the housing 14 is provided with an attachment portion 40 which bears with its peripheral region against the end face 42 of the housing 14 and which, in the central region, at its side towards the housing 14, has a recess 44 which is of a somewhat larger diameter than the sleeve 16. The attachment portion 40 is also provided with a bore 39 for the piston rod 30 to pass therethrough.

Near its end face 42 which is towards the second cylinder 34, the housing 14 is provided with a substantially radially extending feed conduit 46 for the plastic material coming from the plasticizer unit 10. That feed conduit 46 communicates with the recess in the housing 14, which is defined by the bore 15 therein. On its outside peripheral surface the sleeve 16 is provided with a distributor passage 50 which is in the form of a groove-like depression or channel 50 and which is arranged to extend substantially around the periphery of the sleeve 16 but extending inclinedly relative to the longitudinal axis of the sleeve 16. The distributor passage 50 is so arranged relative to the feed conduit 46 that, in the end position of the sleeve 16 shown in FIG. 1, the one apex region 52 of the distributor passage 50 is disposed opposite the mouth opening of the feed conduit 46 so that, starting from that apex region 52, the distributor passage 50 extends at an acute angle relative to the longitudinal axis of the housing 14 and thus the sleeve 16 at both sides of the latter towards the thickened end portion 38 of the sleeve and the second apex region 53 of the distributor passage 50 is arranged in displaced relationship with respect to the first apex region 52 thereof, in a direction towards the free entry end 28 of the sleeve 16. Adjoining the distributor passage 50 which is delimited on the outside by the inner peripheral surface of the housing 14 is an annular gap 54 which is delimited by the outer peripheral surface of the sleeve 16 and the inner peripheral surface of the bore 15. In the end position of the sleeve 16 as shown in FIGS. 1, 2B and 2C, the annular gap 54 extends from the distributor passage 50 to the entry end 28 of the sleeve 16, which terminates at a small spacing from the oppositely disposed wall of the bore 15, where the annular gap 54 experiences a change in direction and goes into the storage space 27. The delimitation of the annular gap 54 at the side remote from the free end 28 of the sleeve 16 corresponds to the configuration of the distributor passage 50. In the other end position of the sleeve 16 as shown in FIGS. 2A and 2D the thickened end portion 38 of the sleeve 16 closes the annular gap 54. The distributor passage 50 serves to distribute the plastic material supplied from one side of the housing 14 over the periphery of the sleeve 16. That mode of distribution is known from extrusion heads in which however the aim involved is then that of converting an arriving solid elongate portion of plastic material into a hollow elongate portion of material.

At its end towards the second cylinder 34, the storage space 27 which is enclosed by the sleeve 16 is of a conically tapering configuration, corresponding to the free end portion of the ejection piston 18 which is to be introduced into the storage space 27, as can be seen from the drawings. That eliminates dead spaces in which particles of plastic material could uncontrolledly remain. Extending from the apex region of the storage space 27 is an outlet conduit 58 which, after a short axial portion, extends radially outwardly, wherein that radial portion is displaced somewhat in the axial direction with respect to the apex region 52 of the distributor passage 50. The crucial consideration in regard to the position of the radial portion of the outlet conduit 58 is the position of a communicating conduit 60 which passes radially through the wall of the housing 14 and which serves, during the injection molding procedure, to make a communication between the outlet conduit 58 and the connecting conduit 74 in the injection molding tool 12. In the position of the parts shown in FIG. 1, the communication between the storage space 27 and the injection molding tool 12 is interrupted as the outlet conduit 58 assumes a position of being displaced with respect to the communicating conduit 60. When the sleeve 16 is in the position shown in FIGS. 2A and 2D, the two conduits 58 and 60 are aligned with each other so that there is a communication between the storage space and the mold cavity or cavities 76 of the injection molding tool 12.

The operating procedure of a working cycle is described hereinafter with reference to FIGS. 2A–2D. The storage space 27 for the plastic material, delimited by the sleeve 16, has been completely or almost completely emptied by the ejection piston 18 which is pushed into the sleeve 16, in which case, by virtue of the force exerted in that situation in the ejection direction 62 by the ejection piston 18, the sleeve had been displaced at the beginning of the ejection stroke movement in the direction indicated by the arrow 62 into its end position shown in FIG. 2A, in which its end face 29 bears against the inner boundary surface 64 of the attachment portion 40. In that position the substantially radial portion 58 of the outlet conduit, which is arranged in the sleeve 16, is aligned with the communicating conduit 60 in the wall of the housing 14 so that the material which is displaced out of the sleeve 16 by the piston 18 flows in a direction towards the injection molding tool 12 arranged downstream of the conduit 60.

During the ejection procedure the sleeve 16 assumes a position in which a part of its second end portion 38 is disposed in the smaller-diameter region of the bore 15, thereby providing a sealing closure effect which closes off the communication between the feed conduit 46 and the storage space 27, as can be seen from FIGS. 2A and 2D. The plastic material which is displaced out of the storage space 27 defined by the piston 16, by the ejection piston 52, is thus prevented from flowing back towards the intake conduit 46. In addition no material would be capable of passing out of the intake conduit 46 into the housing 14 as the pressure possibly exerted by the plasticizer unit 10 by way of the feed conduit 46 and the distributor passage 50 would be too low for it to be able to produce displacement of the sleeve 16 in the opposite direction to the direction 62. That is to be attributed not least to the fact that the surfaces of the sleeve 16, which would be acted upon in opposite relationship to the direction 62 by the pressure possibly applied by the plasticizer unit are much smaller than the surfaces of the sleeve 16 which are acted upon by the pressure of the ejection piston 18, which pressure acts in the direction 62.

At the end of the emptying stroke movement the parts approximately adopt the position shown in FIG. 2A.

It is generally necessary after the operation of filling of the injection moulding tool by the ejection piston 18, for the plastic material in the injection molding tool to be kept under pressure in the post-pressure phase and possibly for small amounts of material also to be displaced towards the injection molding tool in order in that way for example to fill up hollow spaces in the mold cavity, which occur due to shrinkage of the plastic material as it cools down in the injection molding tool. The actual ejection procedure is terminated before the ejection piston 18 has reached the end position defined by the end portion of the cylinder 24 which serves as an abutment, as is shown in FIG. 2A. The remaining short travel distance between the position at the end of the ejection stroke movement of the ejection piston 18 and the maximum stroke movement which is defined by abutments can be used for the post-pressure effect. That accordingly means that, at the end of the post-pressure phase, the ejection piston 18 assumes a position which cannot be precisely predetermined as it depends on the amount of material which during the post-pressure phase has also been displaced towards the injection molding tool 12 by the ejection piston 18 which is still acted upon by the operating piston 22.

After termination of the post-pressure phase the sleeve 16 is moved axially from the position shown in FIG. 2A into the position shown in FIG. 2B—and FIG. 1—by actuation of the piston 32 in the operating cylinder 34 and with suitable relief of the load acting on the piston 22, while at the same time the ejection piston 18 with associated operating piston 22 is also entrained by the sleeve 16 and correspondingly moved back. Due to that displacement of the sleeve 16 in opposite relationship to the direction 62, the substantially radial outlet conduit 58 in the sleeve 16 is displaced relative to the radial communicating conduit 60 in the housing wall, to such an extent that there is no longer any communication between those two conduits. At the same time, with that displacement, the first apex region 52 of the distributor passage 50 is moved into a position in which it is disposed opposite the feed conduit 46 in the housing 14. In addition the larger-diameter end portion 38 of the sleeve 16 is moved out of the smaller-diameter region of the bore 15 so that, as FIG. 1A shows, the plastic material flowing in through the feed conduit 46 can now again flow through the distributor passage 50 and the annular gap 54 between the sleeve 16 and the housing 14 and the annular gap 19 between the sleeve 16 and the ejection piston 18, into the storage space 27, in which case at the same time the ejection piston 18 is pushed back in opposite relationship to the direction 62 until it assumes its second end position, that is to say the position shown in FIG. 2C. At that moment the storage space 27 is filled again, the degree of filling of the storage space 27 and therewith the end position of the ejection piston 18 also depending on the amount of material which is required to fill the injection molding mold in each working cycle. By virtue of the fact that the two conduits 58 and 60 are not aligned with each other, the material cannot flow further towards the injection molding tool 12, in the phase of filling the storage space 27.

The amount of plastic material which flows into the storage space 27 in each working cycle substantially depends on the position of the ejection piston 18 at the end of the post-pressure phase. In this case also it is guaranteed that the parts of the plastic material which had first flowed into the storage space 27 are also the first to be displaced out of the storage space towards the injection molding tool 12 (first in-first out). That is promoted by virtue of the tapering configurations of the storage space and the free end of the ejection piston 18.

Furthermore the configuration of other parts in the injection molding cylinder 18 also contribute to achieving advantageous flow conditions. Thus, a large part of the plastic material coming from the plasticizer unit 10, on leaving the feed conduit 46, flows into the groove-like distributor passage 50 arranged on the outer peripheral surface of the sleeve 16 in order thus to pass a part of the material directly onto the peripheral region of the sleeve 16, which is remote from the feed conduit 46, and to provide that the plastic material is distributed as uniformly as possible over the outer periphery of the sleeve 16. In that situation the material flows on the way from the first apex region 52 to the second apex region 53 out of the distributor passage 50 and into the annular gap 54 adjoining same. The above-described conditions provide that, in spite of the fact that the plastic material is introduced laterally into the housing 14 and perpendicularly to its longitudinal axis, the plastic material is distributed uniformly around the sleeve 16, wherein formed in the second apex region 53 of the distributor passage 50 which is towards the free end 28 of the sleeve is a closed annular flow formed from the plastic material which initially flows towards the free end 28 of the sleeve 16 and after passing same into the annular gap 19 between the inner peripheral surface and the ejection piston 18 and through same and with simultaneous displacement of the ejection piston 18 into the storage space 27. Annular distribution of the material around the sleeve 16 is also advantageous for the reason that this then also provides for a uniform flow of the material into the storage space 27. During filling of the storage space 27, the length of the annular gap 19 decreases until finally the annular gap 19 no longer exists, when the parts are in the position shown in FIG. 1 and FIG. 2C. The configuration of the flow paths and the co-operation of the ejection piston 18 and the sleeve 16 provide that the plastic material which in the filling operation first passes into the storage space 27 is also the first to be ejected again in the subsequent ejection procedure. That provides that the residence times of the individual particles of plastic material in the storage space 27 and in the overall system is rendered substantially uniform, and that fact is of benefit in terms of the quality of the article to be produced in the injection molding tool.

In the region between the groove-like distributor passage 50 and the end face 42 of the sleeve 16, the outside diameter of the sleeve 16 corresponds to the inside diameter of the bore 15 in the housing 14 so that in that region, between the outside peripheral surface of the sleeve 16 and the inside peripheral surface of the bore 15, there is a sealing seat which on the one hand permits axial displacements of the sleeve 16 within the housing 14 and in that case guides the sleeve 16, while on the other hand it at least very substantially prevents the penetration of plastic material into the separating surface between the housing 14 and the sleeve 16.

As soon as the ejection piston 18 has reached its end position shown in FIG. 2C, after conclusion of the filling operation, being the end position in which the volume of material required for filling the injection molding tool has been accumulated in the storage space 27, the piston 22 of the first operating cylinder 24 is actuated, with the beginning of the following working cycle, which has the consequence that, with the beginning of displacement of the ejection piston 18 in the direction of the arrow 62, the sleeve 16 with the storage space 27 enclosed thereby and the plastic material stored therein, is axially displaced from the position shown in FIG. 2C into the position shown in FIG. 2D again, in which the end face 29 of the sleeve 16 bears against the attachment portion 40 serving as an abutment. In that situation the piston 32 which is guided in the second operating cylinder 34 is correspondingly relieved of pressure. In the course of that displacement the radial portion of the outlet conduit 58 is moved again into a position in which it is aligned with the communicating conduit 60 in the wall of the housing 14. The ejection procedure is terminated when the parts reach the position shown in FIG. 2A.

In the embodiment shown in FIG. 1 of the drawing the housing 14 is additionally provided with a relief conduit 70 in the wall of the housing 14, which extends at the small spacing from the communicating conduit 60 and which can be communicated with the conduit 60 by way of a recess 72 provided in the end portion of the sleeve 16, which is towards the second cylinder 34. In that case the recess 72 is so arranged relative to the two conduits 60 and 70 that, when the sleeve 16 is in a position in which the outlet conduit 58 and the communicating conduit 60 are aligned with each other, that is to say, in the position shown in FIGS. 2A and 2D, the recess 72 is outside the region of opening of the communicating conduit 60 at the inner peripheral surface of the bore 15 so that no plastic material flowing out of the outlet conduit 50 can flow into the recess 72 and from there into the adjoining relief conduit 70. In the other end position of the sleeve as shown in FIGS. 2B and 2C, there is a communication by way of the recess 72 between the communicating conduit 60 and the relief conduit 70 which opens into the open air at its end remote from the recess 72. That configuration takes account of the fact that at least the portion of the connecting conduit 74, which is towards the housing 14, is heated, like the injection molding cylinder 11, so that the plastic material therein remains in its plastic condition even during cooling of the plastic material in the mold cavity or cavities 76. As that material in a plastic condition in the conduits 60 and 74 is under a certain increased pressure, by virtue of the previously performed post-pressure phase, it would also be necessary to be prepared for the fact that, when the finished article is removed from the mold cavity or cavities 76, the material in plastic form in the conduits 60 and 74 expands and passes into the mold cavity from the conduits. That would make it necessary to clean the mold cavity prior to each injection operation, as otherwise there would be a fear of adverse effects on quality of the articles to be produced in the mold cavities. The presence of the relief conduit 70 provides for pressure relief and possibly expansion of that plastic material into the relief conduit 70 after displacement of the sleeve 16 into the position shown in FIG. 1 or the position shown in FIGS. 2A and 2C, so that expansion into the mold cavity is avoided.

FIG. 3 shows two units I and II each with injection storage means 111 and downstream-connected injection molding tool 112, upstream of which is connected a common plasticizer unit 110 in the form of a screw extruder 148. As in other respects the parts correspond to those of the embodiment shown in FIGS. 1 and 2A–2C, the same parts are also denoted by the same references which however are increased by 100 in FIG. 3.

The two storage spaces 127 which are each delimited by a respective sleeve 116 are charged alternately by an extruder 148 whose screw 149 is axially displaceably mounted in known manner so that, in the course of the plasticization operation, a supply of plastic material accumulates in front of the end of the screw 149, which is towards the distributor 178, and that supply of material, as soon as a sufficient volume is reached, is ejected into the respective storage means 127 to be filled, by an axial movement of the screw 149. In the position shown in FIG. 3 of the drawing, the filling procedure in respect of the storage space 127 of the unit I on the right has just been concluded as the ejection piston 118 assumes its end position at the end of the filling operation and the screw 149 assumes its end position at the end of the ejection procedure caused by axial displacement thereof. The screw 149 of the extruder 148 continues to run continuously and collects the plastic material in the time in which the plasticized plastic material cannot be passed along directly for filling one of the two storage spaces 127.

As, during the operation of filling the storage space 127 of the unit I, the sleeve 116 of the unit II at the left is displaced into its right-hand end position in which the outer peripheral surface of the thickened end portion 138 of the sleeve 116 forms a closure means with the inner peripheral surface of the smaller-diameter region of the bore 115, in the operation of filling the storage space 127 of the unit I material can only flow through the conduit 180 of the distributor 178, which leads to the unit I, whereas the conduit 182 leading to the unit II is blocked by virtue of the closure effect provided by the sleeve 116 of the unit II. Immediately subsequently to the operating condition in which the parts are in the position shown in FIG. 3, the ejection piston 118 of the unit I is moved towards the left in order firstly to displace the sleeve 116 into its other end position in which the two conduits 158 and 160 are aligned with each other, whereupon then the material is displaced out of the storage space 156 towards the injection molding tool 112 in the unit I. During that injection molding procedure, that is to say during emptying of the storage space 127 with simultaneous filling of the at least one mold cavity 176 of the injection molding tool of the unit I, the storage means of the extruder 148 is filled again, with the screw 149 being axially moved back at the same time, so that in the next working step the storage means 127 of the injection molding cylinder of the unit II can be filled by axial displacement of the thrust screw after the sleeve 116 of that unit had previously been displaced into the left-hand end position in order to interrupt the communication between the two conduits 158 and 160. The output of the plasticizer unit 110 on the one hand and the time required for injection of the plastic material into the injection molding molds 112, cooling and solidification of the plastic material disposed in the mold cavities 176, and opening and closing of the injection molding mold 112, on the other hand, can be so matched to each other in that respect that the plasticizer unit is continuously in operation, that is to say the screw 149 continuously operates, wherein the operation of filling the respective storage means 127 is incorporated into the overall cycle, in respect of time, in such a way that, after termination of the post-pressure phase and the operation, which is then possible, of removing from the injection molding tool 112 the articles produced in the preceding working cycle and then closing the injection molding tool, the injection molding procedure can be effected by emptying the respective storage space 127.

A similar consideration also applies in regard to an embodiment in which only one injection molding cylinder 11 is connected downstream of the plasticizer unit 10, as could be the case for example with the embodiment shown in FIG. 1.

In the embodiment shown in FIG. 3 the two units I and II are charged alternately by the common plasticizer unit 110. It will be appreciated that it is also possible for more than two units consisting of an injection molding cylinder and an injection molding mold to be associated with a plasticizer unit 110.

The embodiment shown in FIGS. 4A and 4B is identical in all parts to those of the embodiment of FIGS. 1 and 2A–2D, with the exception of the configuration of the sleeve and the bore accommodating same, in the region in which the sleeve and the peripheral surface of the bore co-operate to form a closure means. Therefore, in FIGS. 4A and 4B, all parts which are the same as the parts of the embodiment of FIGS. 1 and 2A–2D are denoted by the same reference numerals increased however by 200.

The only difference is that the substantially conical transitional surface 286 in the peripheral surface delimiting the bore 215 is in the form of a valve seat whose valve body, co-operating therewith, is formed by the thickened end portion 238 of the sleeve 216. As a departure from the embodiment shown in FIG. 1 and FIGS. 2A–2D however the outside diameter of the thickened end portion 238 is clearly larger than the inside diameter of the bore 215 in the smaller-diameter region thereof, which extends from the end face 242 of the sleeve 216 to the transitional surface 286. The result of this is that, when the sleeve 216 assumes its end position shown in FIG. 4B, in which the communication between the storage space 227 and the injection molding mold is opened, the transitional surface 288 of the sleeve 216 sits on the transitional surface 286 of the bore 215 and thus forms the closure effect. In that respect the arrangement is desirably also such that the two transitional surfaces 286 and 288 extend substantially parallel to each other. That is advantageous not least in consideration of the fact that a considerable pressure which can be 1000 bars and more acts on the sleeve 216 during the emptying procedure. It is apparent that in that case the sleeve 216 is pressed with a correspondingly high force against the transitional surface 286 which serves as the valve seat, and that transitional surface 286 is correspondingly subjected to pressure. Therefore the contact surface area between the sleeve 216 and the valve seat should be as large as possible in order in that way to keep within certain limits the pressure per unit of area, in relation to the materials which are usually employed for the components of the injection cylinder.

When the sleeve 216 is in the other end position as shown in FIG. 4A, which it adopts during filling of the storage space 227, as in the embodiment shown in FIGS. 1 and 2A–2C the annular gap 254 is present between the housing 214 and the sleeve 216, as in the case of the embodiment shown in FIGS. 1–3.

In the embodiment shown in FIGS. 1–3 there does not need to be a gap-free fit between the thickened end portion 38 of the sleeve 16 and the peripheral surface of the bore 15 in the smaller-diameter region in order to achieve an adequate sealing effect. Because of the high pressure already mentioned above during the injection moulding procedure, that is to say during emptying of the storage space, the sleeve 16, including the thickened end portion 38 thereof which represents the free end of the sleeve, experiences a certain degree of expansion effect which has the result that the outer peripheral surface of the thickened end portion of the sleeve 16 is pressed outwardly and thus in the region in which the closure effect is formed against the smaller-diameter peripheral surface of the bore 15, whereby a sealing closure effect is always produced. Tolerances in respect of the fit, if they do not exceed a given magnitude, are compensated by the above-mentioned effect of expansion of the sleeve. On the other hand, after termination of the effect of the pressure, that is to say generally after termination of the post-pressure phase, the expanded part of the sleeve experiences a resilient return effect so that there is then again automatically so much clearance between the outer peripheral surface of the thickened end portion 38 and the peripheral surface of the bore that the sleeve can be axially displaced without difficulties.

The apparatus according to the invention can be used for the production of finished products but also for the production of intermediate products. The latter may be for example preforms from which a final product, for example a bottle, is produced in a blow molding mold in at least one further processing step.

I claim:

1. An injection molding apparatus for processing thermoplastic materials comprising at least one plasticizer unit for filling at least one injection molding cylinder with an associated ejection piston for emptying said cylinder and at least one injection molding mold, wherein the injection molding cylinder has a sleeve which is arranged axially reciprocally in a housing between a position in which the communication with the injection molding mold is interrupted and a position in which the communication with the injection molding mold exists, wherein a passage is provided between the sleeve and the housing at least in the position in which the communication with the injection molding mold is interrupted and one end of the passage is in communication with an internal storage space defined by the sleeve and having an entry end, a feed conduit for the plastic material coming from at least one plasticizer unit, the feed conduit opening into a passage adjacent an outlet end of the internal storage space, an outlet conduit for the plastic material stored in the internal storage space extending from the outlet end of the storage space towards the injection molding mold at the outlet end, the sleeve being longitudinally displaceable so that in one end position of the sleeve the outlet conduit from the storage space is closed and a through-flow of plastic material is not possible and in a second end position of the sleeve the outlet conduit from the storage space is connected to the injection molding mold, the outside diameter of the ejection piston being slightly smaller than the inside diameter of the sleeve so that an annular gap exists between the two.

2. An injection molding apparatus as claimed in claim 1, wherein the passage between the sleeve and the housing is in the form of an annular gap.

3. An injection molding apparatus as claimed in claim 1, wherein provided on the outside peripheral surface of the sleeve is a distributor passage which extends at least around a part of the periphery of the sleeve, and wherein the annular gap between the sleeve and the housing extends from the distributor passage towards that end of the sleeve.

4. An injection molding apparatus as claimed in claim 3, wherein the distributor passage extends at an acute angle relative to the longitudinal axis of the sleeve, and the distributor passage having an apex region of the sleeve, and which during the filing phase, is disposed opposite the opening of the feed conduit for the material coming from the plasticizer unit.

5. An injection molding apparatus as claimed in claim 1, wherein the sleeve is arranged in a bore in the housing and at an end region towards the entry end of the sleeve the bore is of a larger diameter and at its end region the sleeve is of a correspondingly larger outside diameter wherein in the one end position of the sleeve the passage between the sleeve and the housing extends continuously to the entry end of the sleeve and in the second end position of the sleeve at least a part of the larger-diameter end region bears against the inside peripheral surface of the housing in the small-diameter region of the bore to form a closure means.

6. An injection molding apparatus as claimed in claim 1, wherein the sleeve (216) is arranged in a bore (215) in the housing and at an end region towards an entry end of the sleeve the bore is of a larger diameter and an end region the sleeve is of a correspondingly larger outside diameter, wherein the transitional surfaces between the regions of different diameters co-operate to form a valve and in the one end position of the sleeve a passage between the sleeve and the housing extends continuously to the entry end of the sleeve and the passage is closed in the other end position of the sleeve.

7. An injection molding apparatus as claimed in claim 1, wherein the end remote from the entry end of the sleeve is connected to a piston guided in a hydraulic operating cylinder in order to produce the movement of the sleeve into at least one of its two end positions.

8. An injection molding apparatus as claimed in claim 1 wherein provided in the housing is a relief conduit which passes through the housing wall and which opens in a bore in the housing which accommodates the sleeve at the side of a communicating conduit remote from the entry end of the sleeve, at a short spacing from the communicating conduit, in the bore, and the sleeve is provided on the outside with a recess which forms the communication between the communicating conduit and the relief conduit, in the position of the sleeve in which the communication between the outlet conduit in the sleeve and the communicating conduit in the housing is interrupted.

9. An injection molding apparatus as claimed in claim 1, wherein an additional shut-off member which can be actuated from outside the apparatus is provided in the communicating conduit between the plasticizer unit and the injection molding cylinder.

10. An injection molding apparatus as claimed in claim 1, wherein connected upstream of an injection molding cylinder is a storage space which is associated with a continuously operating plasticizer unit and the plastic material stored in said storage space is ejected by an ejection piston towards the storage space of the injection molding cylinder.

11. An injection molding apparatus as claimed in claim 10, wherein connected downstream of the plasticizer unit are at least two injection cylinders which are charged alternately from the plasticizer unit and the storage space associated therewith.

12. An injection molding apparatus as claimed in claim 10, wherein at least one plasticizer unit is in the form of an extruder provided with a thrust screw which forms the ejection piston of the storage means associated with the plasticizer unit.

* * * * *